Feb. 25, 1964    W. F. LAUN    3,122,065
REVERSIBLE ACTUATOR FOR AUTOMATIC VALVES
Filed Jan. 11, 1960    4 Sheets-Sheet 1

INVENTOR.
WALTER F. LAUN
BY James C. Nemmers
ATTORNEY

INVENTOR.
WALTER F. LAUN
BY
ATTORNEY

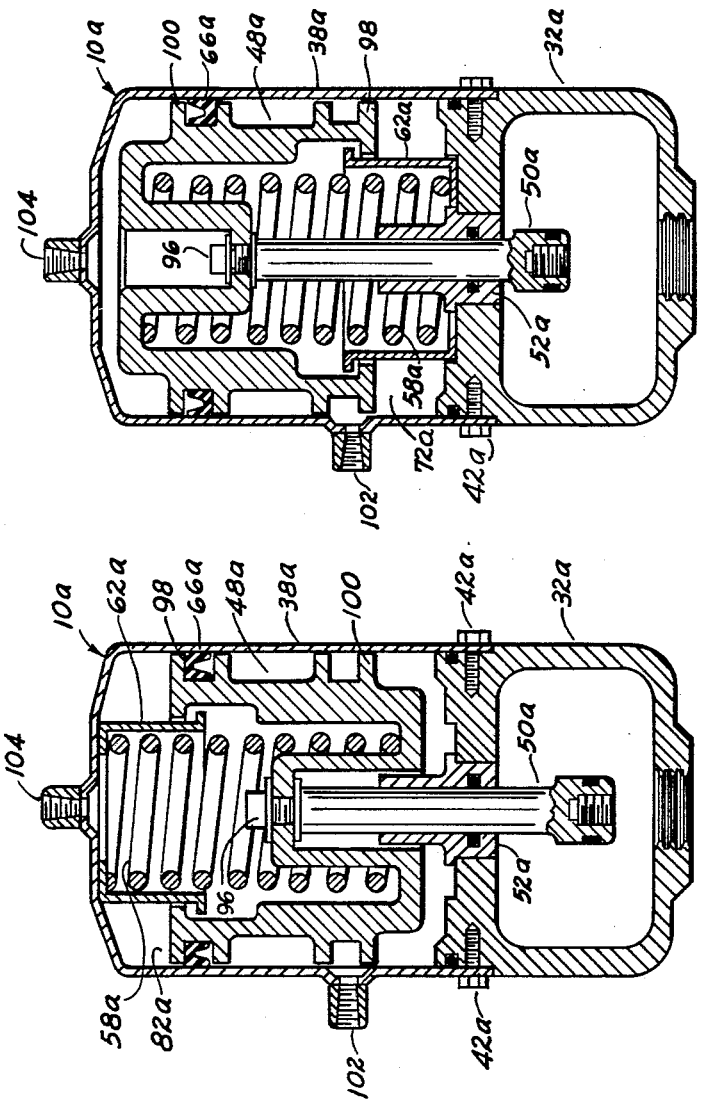

United States Patent Office 3,122,065
Patented Feb. 25, 1964

3,122,065
REVERSIBLE ACTUATOR FOR AUTOMATIC VALVES
Walter F. Laun, Little Falls, N.Y., assignor to Cherry-Burrell Corporation, Cedar Rapids, Iowa, a corporation of Delaware
Filed Jan. 11, 1960, Ser. No. 1,670
9 Claims. (Cl. 92—59)

This invention relates to automatic valves and more particularly to an air-operated actuator for valves of a sanitary design.

Air-operated automatic valves are of many types but fall into three general classifications. These are: (1) those in which pressurized air is used to raise a valve member from its seat, commonly referred to as the "air-to-raise" valve; (2) those in which pressurized air is used to lower the valve member away from contact with the valve seat, commonly referred to as the "air-to-lower" valve; and (3) those in which the valve member may be held at a "midposition" between two seats thereby opening all branches leading from the valve. The third class of valves is actually a design feature that can be added to either the air-to-raise or air-to-lower type valves in installation where it is desired to clean all lines in place at the same time.

Since each of these three general classifications of valves is manufactured in at least four different valve sizes, the manufacturer of automatic valves must design and supply at least twelve different actuators in order to provide a complete line of valves to his customers. This is obviously disadvantageous from a manufacturer's point-of-view and is also undesirable from the standpoint of the valve user who may have an installation requiring a number of different types and sizes of automatic valves and he must therefore stock repair parts for many different actuators and valves.

I have also found that many of the automatic valves presently on the market are difficult to disassemble and assemble for cleaning and in many of these valves, although of a sanitary design, it is possible for lubricant from the actuator to leak into the valve or for the fluid to leak from the valve into the actuator.

It is therefore a principal object of my invention to provide an automatic valve actuator comprised of parts whose relative positions may be changed to produce an actuator for either an air-to-raise or an air-to-lower valve without adding or omitting any parts in carrying out the conversion. Moreover, with the proper air supply arrangement, a valve using my actuator can be placed in mid-position when it is desired to clean the valve.

It is a further object of my invention to provide a single automatic valve actuator that can be used on almost any size or type of valve. Thus, a manufacturer has to make and supply only one actuator for his entire line of valves and likewise the user of automatic valves has to stock only one actuator.

It is another object of my invention to provide an actuator-valve structure that is more sanitary than those known to date. In my novel automatic valve it is practically impossible for fluid to leak from the valve into the actuator or for the lubricant in the actuator to leak into the valve. Thus, it is not necessary to disassemble my actuator and clean it each time the valve itself is cleaned.

It is still another object of my invention to provide an automatic valve that is easy to assemble and disassemble since the actuator can be separated from the valve without disassembly of the actuator. Moreover, in certain cases where assembly would otherwise be extremely difficult, the pressure of the air may be utilized to connect the actuator to the valve.

It is a further object of my invention to provide an improved venting arrangement for an air-operated automatic valve.

It is still another object of my invention to provide an automatic valve that is extremely simple, composed of a minimum number of parts, and one that is therefore inexpensive to manufacture.

These and other objects of my invention will be readily apparent from a consideration of the following description taken in connection with the accompanying drawing in which:

FIGURES 5 and 6 are sectional views similar to FIGURES 3 and 2 respectively and illustrating another embodiment of my invention.

Figure 1:
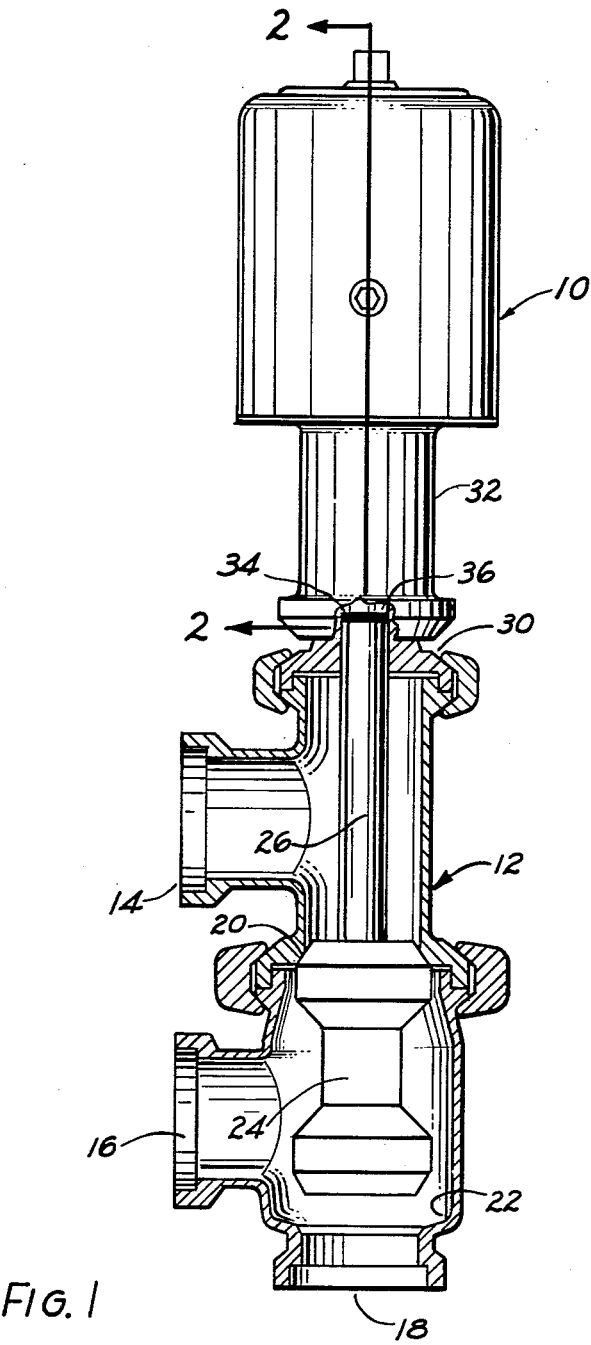
FIGURE 1 is an elevational view showing the actuator embodying my invention mounted on a valve of one type with which it can be used and showing the valve in section.
Figure 2:
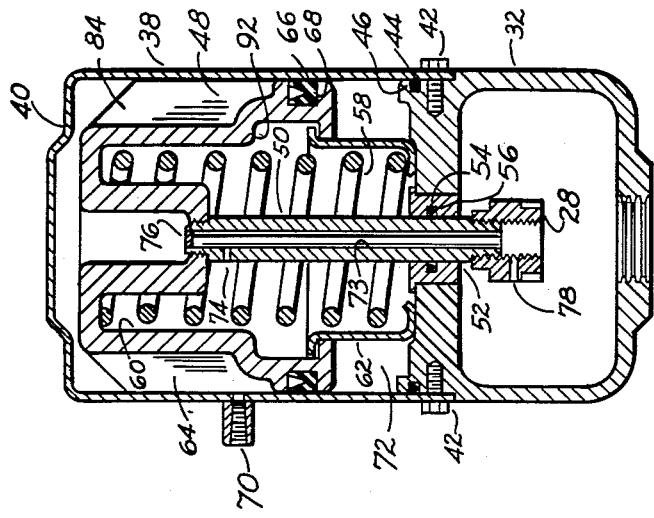
FIGURE 2 is a sectional view of the actuator taken on the line 2—2 of FIGURE 1 and showing the actuator parts in position to form an air-to-lower valve.

Referring now to FIGURE 1, the automatic valve shown is of the air-to-lower type and consists of an actuator, indicated generally by the reference numeral 10, mounted on a three-way valve indicated generally by the reference numeral 12. The type of valve shown is merely illustrative of the wide variety of valves with which the actuator can be used. These include two-way, three-way cross-top, three-way cross-bottom, and three-way cross-top-and-bottom type valves. The valve 12 shown is a standard three-way valve which has three branches 14, 16 and 18. The valve has two seats 20 and 22 and in its normal position without applied air pressure, the valve member 24 seats on seat 20, thereby interconnecting branches 16 and 18. When air is applied to the actuator 10, the valve member 24 will be lowered to seat 22 and in this position, the flow through the valve will be through branches 14 and 16. The valve member 24 is connected to a rod 26 which extends out the top of the valve and into the actuator 10. Rod 26 is connected directly to the working portion of the actuator 10 by means of a coupling 28 (FIGURE 2). To secure the actuator 10 to valve 12, an adaptor 30, which forms a part of valve 12, is threaded into the base portion 32 of the actuator. The importance of this adaptor 30 will become more apparent hereinafter. An O-ring 34 fitted in a groove 36 in rod 26 prevents fluid from leaking out out of the valve.

As best seen in FIGURE 2, the base portion 32 of actuator 10 is a yoke-shaped structure and mounted on its top portion is a hollow cylindrical shell 38 that has a closed end 40. The open end of cylinder 38 is secured to the base portion 32 by a plurality of cap screws 42, and a seal is provided by an O-ring 44 located in a groove 46 in base portion 32.

A piston 48 is slidably mounted in the cylinder 38. The piston 48 is connected to valve 12 through the coupling 28 by means of a piston rod 50, one end of which is threaded in the coupling 28 and the other end threaded in the piston 48. The piston rod 50 is guided by bushing 52 secured in the base member 32. An O-ring 54 in a groove 56 of bushing 52 provides a fluid-tight seal between the piston rod 50 and the bushing 52. A compression spring 58 has one end received in a circular recess 60 in piston 48 and its other end held by a retainer 62. The retainer 62 is connected to piston 48 in a manner that allows the piston to move axially through a limited distance relative to the retainer. The manner of connection will be described hereinafter. Thus, the piston 48 serves the additional functions of a retainer and guide for the spring 58.

A somewhat annular chamber 64 is formed between the inside wall of cylinder 38 and the outer surfaces of piston 48 that extend above a packing 66, which is fitted in a groove 68 in piston 48. Air under pressure is admitted into the chamber 64 through an inlet 70 and is prevented from leaking from chamber 64 between the piston 48 and the wall of cylinder 38 by means of packing 66. A chamber 72 is defined approximately by the inside wall of cylinder 38 below packing 66 and the inner surfaces of piston 48. When air enters the inlet 70, it increases the pressure in chamber 64 and the pressure differential thus created between chamber 64 and chamber 72 will cause the piston to move downward. As it moves, piston 48 carries with it piston rod 50 which is connected to the valve rod 26 thereby unseating valve member 24 from seat 20 and opening the flow through branches 14 and 16 while closing the flow through branch 18.

Since it is impossible to completely prevent air from by-passing the piston 48 into chamber 72, and since it may be necessary to maintain air pressure in chamber 64 for a considerable length of time, leakage could eventually equalize the pressure between chambers 64 and 72. To prevent this from occurring, I prefer to make the piston rod 50 hollow with a passage 73 throughout its length and provide a vent opening 74 near one end. This end of the passage 73 is then closed off by threading a plug 76 in the end of rod 50. I then provide a vent 78 in coupling 28 and thread the open end of piston rod 50 into coupling 28. Thus, the chamber 72 will always be at atmospheric pressure regardless of the amount of air leakage from chamber 64 since any leakage will pass between the piston 48 and retainer 62, through the vent 74, down the passage 73, and out the vent 78 to the atmosphere. This arrangement permits a pressure differential between chambers 64 and 72 to be maintained at all times under normal conditions.

Figure 3:
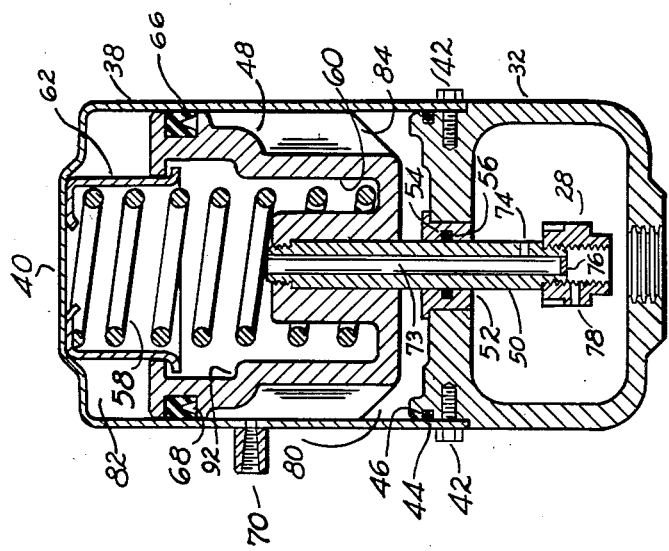
FIGURE 3 is a sectional view similar to FIGURE 2 but showing the parts of the actuator in position to provide an air-to-raise actuator.

Referring now to FIGURE 3, the actuator 10 is shown with its components in position to provide air-to-raise operation. It should be noted that the components of the actuator 10 as shown in FIGURE 3 are identical to those shown in FIGURE 2, the piston 48, spring retainer 62, and piston rod 50 merely having been inverted from their positions in FIGURE 2.

The actuator 10 in the embodiment shown in FIGURE 3 operates as follows: air is admitted through the inlet 70, which is in the same position in cylinder 38 as that shown in FIGURE 2, into a chamber 80. Chamber 80 is defined approximately by the outer surfaces of the piston 48 and the inside wall of cylinder 38 below the packing 66. A chamber 82 is defined approximately by the inner surfaces of the piston 48 and that portion of the inside wall of the cylinder that extends above packing 66. The pressure differential created between chambers 80 and 82 by the admission of pressurized air through inlet 70 raises the piston 48 and piston rod 50 thereby actuating the valve 12. Should air happen to leak past the packing 66 from chamber 80 into chamber 82, it will flow between the retainer 62 and piston 48, into the open end of the piston rod 50 (which in this embodiment is threaded into the piston), down the passage 73, and out through the vent 74. Since the end of the piston rod 50 containing plug 76 is threaded into coupling 28, it blocks off communication of vent 78 with the passage 73.

In order to provide an actuator that will "mid-position" the valve member 24 between the two seats of the valve 12, I prefer to supply air selectively to the inlet 70 at two different pressures. This may be controlled in any suitable manner such as providing a valve in each air supply line, those lines being connected to a single line that leads to inlet 70. The air pressure in one supply line must, of course, be great enough to overcome completely the force exerted by the spring 58, while the other air pressure must be sufficient to overcome only part of the spring force and thereby position the piston 48 in a "mid-position".

Figure 4:
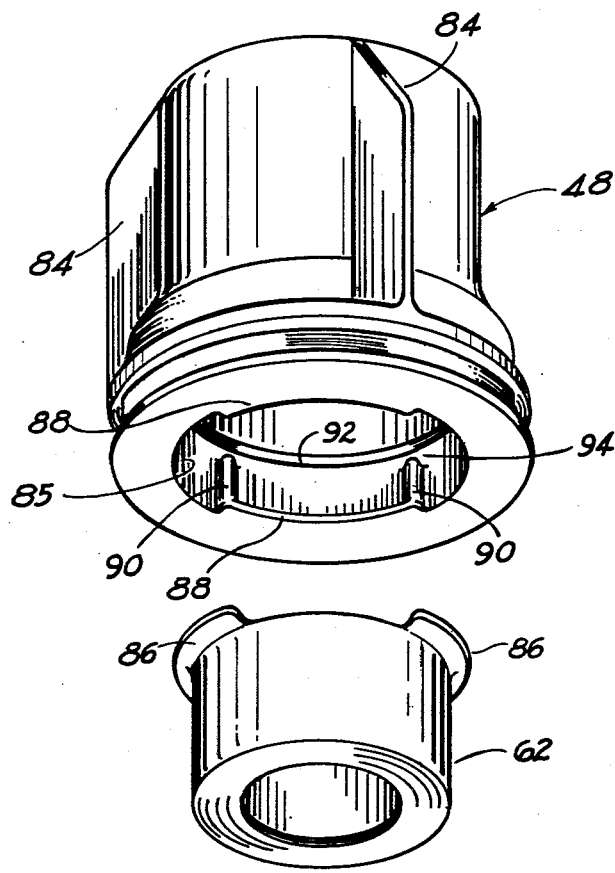
FIGURE 4 is a perspective view of the piston and spring retainer that form a part of the actuator. The view shows the two parts disassembled and helps to illustrate how they are assembled.

It is now apparent that I have provided an actuator structure in which certain parts may be inverted to provide actuation in either direction. This has been made possible by the novel design and arrangement of the actuator, the principal components of which, the piston 48 and spring retainer 62, are shown in perspective in FIGURE 4. I prefer to make the piston 48 of cast aluminum and around its exterior I provide three equally spaced longitudinal fins 84 which serve to prevent the piston 48 from tilting in the cylinder 38. As best seen in FIGURE 4, the piston 48 has a large opening 85 at one end. This opening 85 is shaped to correspond to the peripheral shape of the retainer 62 which includes the flanges 86. To form this shaped opening 85, the piston 48 has two flanges 88 that extend radially inward from the otherwise circular opening. Four ribs 90, one at each end of each flange 88, are formed on the inside surface of the piston 48 perpendicularly to flanges 88. These ribs 90 do not extend into piston 48 as far as the ledge 92 (FIGURES 2 and 3) and therefore a space 94 is formed between each rib 90 and the ledge 92. These spaces 94 must be greater than the thickness of flanges 86 of retainer 62.

To assemble the actuator 10, it is necessary to use an arbor press to overcome the force of spring 58. With the spring 58 in place in the recess 60 of the piston, the retainer 62 is inserted with its flanged end first into the open end of the piston. As the spring 58 is compresesd, the flanges 86 of the retainer 62 slide along between the ribs 90 until the ledge 92 prevents further movement. Then, with the flanges 86 of the retainer 62 in the spaces 94, the retainer 62 is turned 90° which positions the flanges 86 between the other diametrically-opposed spaces formed by the ribs 90. When the spring 58 is released, it will force the retainer 62 back toward the open end of the piston 48 with the flanges 86 sliding between the ribs 90. However, the retainer 62 will not be forced out of the piston 48 because the flanges 86 will contact piston flanges 88 and thereby hold the piston 48 and retainer 62 together. It will be noted that although the piston 48 and retainer 62 are now locked together, the piston 48 can still move relative to the retainer 62, being guided by the sliding of the ribs 90 along the flanges 86 of the retainer. This relative movement is, of course, necessary to the operation of the actuator 10.

The second embodiment of my invention is illustrated in FIGURES 5 and 6. The actuator shown in FIGURE 5 has its parts in position for use with an air-to-raise type valve, while the actuator in FIGURE 6 has its parts in position to provide air-to-lower type actuation. In referring to these figures, parts corresponding to those of the first embodiment will receive the same reference numerals followed by the subscript "a."

In this second embodiment the actuator comprises a base 32a on top of which is mounted a hollow cylindrical shell 38a. The shell is secured to the base by means of a plurality of cap screws 42a. Piston 48a is slidably mounted in the cylinder 38a and is connected to the valve to be actuated by means of piston rod 50a, one end of which is internally threaded to receive the threaded end of the valve rod (not shown). Note that the piston rod 50a is solid whereas piston rod 50 shown in the first embodiment has passage 73 throughout its length. The passage 73 has been eliminated in the second embodiment since other means, described hereinafter, for venting the interior of the cylinder are provided.

The other end of the piston rod 50a is threaded into the piston 48a and is further secured and locked thereto by means of a bolt 96 that is threaded into the end of the piston rod 50a. A spring 58a and a retainer 62a are associated wtih the piston 48a in the same manner as in the first embodiment.

The piston 48a, unlike that of piston 48 of the first embodiment, has no longitudinal fins, but instead has two spaced-apart circumferentially extending flanges 98 and 100 each having a circumferentially extending groove therein adapted to receive a packing 66a. As is readily seen from a comparison of FIGURES 5 and 6, when the components of the actuator 10a are in position to form an air-to-raise actuator (FIGURE 5), the groove in flange 98 contains the packing 66a, whereas when the components are in a position to form an air-to-lower actuator (FIGURE 6), the packing 66a is placed in the groove in flange 100. In either case, the flange not containing the packing 66a serves to prevent the piston 48a from tilting, thus performing the same function as the fins 84 in the first embodiment.

Also unlike the first embodiment, which shows a single inlet port 70, the embodiment of FIGURES 5 and 6 has two ports 102 and 104, the former being located on the side of cylinder 38a and the latter at the top thereof. Either of these ports 102 or 104 can be used as an inlet or a vent depending upon the type of valve to which the actuator is fitted. Thus, as shown in FIGURE 5, when the actuator is fitted to operate an air-to-raise type valve, port 102 becomes the air inlet while port 104 functions as a vent, venting chamber 82a to the atmosphere. Similarly, when the components of the actuator 10a are positioned to operate an air-to-lower type valve (FIGURE 6), the port 104 serves as the air inlet while the port 102 serves to vent the chamber 72a to the atmosphere. The additional port of this second embodiment serves the same function as the passage 73 in rod 50 and the vents 74 and 78 of the first embodiment.

Except for the above noted differences, the second embodiment of FIGURES 5 and 6 is substantially the same as the first embodiment both structurally and operationally. It is thus seen that in either of these embodiments I have provided a single actuator that can perform the functions of air-to-raise, air-to-lower, and midposition actuators without adding or taking away any of the components within the cylinder. Moreover, I can use the same actuator for any size valve by using adaptors 30 that all have the same size thread to fit the base 32 or 32a of the actuator 10 or 10a respectively.

A further feature of my automatic valve is that it is almost impossible for lubricant to leak from the actuator to the valve, or for fluid to pass from the valve to the actuator. Any lubricant that should leak from the interior of the cylinder 38 or 38a will leak through bushing 52 or 52a but there is no path for it to follow to get into the interior of the valve. Likewise, any fluid leaking from the valve will flow along the valve rod 26 and out into the open without following a path into the interior of the actuator. This leakage is exposed to view and can easily be cleaned off without disassembling of either the valve or the actuator itself.

With my novel valve, it is not necessary to disassemble the actuator 10 or 10a to clean the valve 12 since the actuator 10 or 10a can be removed from the valve 12 as a unit. Disassembly of the actuator itself is almost never necessary since it is practically impossible for foreign matter to find its way into the interior of the actuator.

It should be noted also that my automatic valve is so constructed that the actuator may be easily assembled to the valve. Howeevr, should an arrangement be encountered where the spring force must be overcome in order to assemble the actuator to the valve, the actuator can be connected to a source of air pressure and the spring force counter-acted in order to permit easy assembly.

Having thus described my invention in a preferred form, it will be obvious to those skilled in the art that modifications may be made without departing from the spirit of my invention, the scope of which is indicated by the following claims.

I claim:

1. A fluid-operated reversible actuator for valves comprising a hollow casing having a cylindrical side wall and end walls defining a substantially cylindrical-shaped chamber, a substantially cup-shaped piston reciprocally movable in said chamber between said end walls, said piston being positionable with the open end facing either end wall of the casing, a valve connecting rod extending into said chamber through an end wall and connectable to said piston when in either selected position, resilient means received in the open end of said piston in either selected position of said piston and engaging an end wall of said casing to bias said piston away from the end wall engaged by said resilient means, and means to move said piston when in either position against the resistance of said resilient means.

2. In the actuator of claim 1, a cup-shaped retainer having its open end facing the open end of said piston to receive and position said resilient means, said retainer being smaller in diameter than the interior of the open end of said piston thereby providing for relative movement of said retainer inside said piston.

3. A fluid-operated reversible actuator for valves comprising a hollow casing having a cylindrical side wall and end walls defining a substantially cylindrical-shaped chamber, a substantially cup-shaped piston reciprocally movable in said chamber between said end walls, said piston being positionable with the open end facing either end wall of the casing, a valve connecting rod extending into said chamber through an end wall and connectable to said piston in either selected position, a first port in said casing communicating with the chamber at one end thereof, a second port communicating with said chamber near the other end thereof, each of said ports being adapted to serve as an inlet or an exhaust port, resilient means received in the open end of said piston in either selected position of said piston and engaging an end wall of said casing to bias said piston away from the end wall engaged by said resilient means, and means to move said piston when in either position against the resistance of said resilient means.

4. The actuator of claim 3 in which said piston has a circumferential groove adapted to receive a seal, a seal is received in said groove, and said ports are so positioned relative to each other that the piston seal is always located between them regardless of the position of said piston.

5. The actuator of claim 4 in which the circumferential groove is located near one end of said piston and a second circumferential groove is located near the other end of said piston, and the seal is selectively positioned in one of said grooves when said piston is in one position and in the other groove when said piston is inverted whereby said seal is always located between said first and second ports.

6. The actuator of claim 5 in which the circumferential groove formed at each end of the piston is formed in a protruding flange that serves also to guide said piston in said chamber.

7. The actuator of claim 1 in which said piston has a peripheral seal near one end thereof, and said casing has an inlet port in said side wall substantially midway between said end walls, said inlet port thereby admitting fluid into said chamber to move the piston in one direction when said piston is in one position and to move the piston in the opposite direction when the piston is in the other position.

8. In the actuator of claim 7, a cup-shaped retainer having its open end facing the open end of said piston to receive and position said resilient means, said retainer being smaller in diameter than the interior of the open end of said piston therefore providing for relative movement of said container inside said piston.

9. The actuator of claim 7 in which said valve connecting rod has a passageway extending therethrough that provides communication between the atmosphere and the interior of said chamber on the side of said piston opposite to said inlet port, said seal providing a pressure seal between said inlet port and said passageway.

References Cited in the file of this patent

UNITED STATES PATENTS

| | | |
|---|---|---|
| 430,689 | Rigg | June 24, 1890 |
| 930,860 | Horridge | Aug. 10, 1909 |
| 2,643,667 | Dahl | June 30, 1953 |
| 2,709,446 | Miller | May 31, 1955 |
| 3,026,896 | Bosworth | Mar. 27, 1962 |